(12) United States Patent  
Bezzel (10) Patent No.: US 12,339,476 B2  
(45) Date of Patent: Jun. 24, 2025

(54) ANGULAR AND SPECTRALLY SELECTIVE SHADING SHEET

(71) Applicant: MICROSHADE A/S, Glostrup (DK)

(72) Inventor: Eik Bezzel, Hvalsø (DK)

(73) Assignee: MicroShade A/S, Glostrup (DK)

( * ) Notice: Subject to any disclaimer, the term of this patent is extended or adjusted under 35 U.S.C. 154(b) by 0 days.

(21) Appl. No.: 18/547,180

(22) PCT Filed: Feb. 22, 2022

(86) PCT No.: PCT/EP2022/054406  
§ 371 (c)(1),  
(2) Date: Aug. 21, 2023

(87) PCT Pub. No.: WO2022/175551  
PCT Pub. Date: Aug. 25, 2022

(65) Prior Publication Data  
US 2024/0061160 A1    Feb. 22, 2024

(30) Foreign Application Priority Data  
Feb. 22, 2021 (EP) .................... 21158445

(51) Int. Cl.  
*G02B 5/20* (2006.01)  
*E06B 9/24* (2006.01)

(52) U.S. Cl.  
CPC .............. *G02B 5/208* (2013.01); *E06B 9/24* (2013.01); *G02B 2207/101* (2013.01)

(58) Field of Classification Search  
CPC .. G02B 2207/123; G02B 5/208; G02B 5/281; G02B 5/282; G02B 2207/101; E06B 9/24  
See application file for complete search history.

(56) References Cited

U.S. PATENT DOCUMENTS

| | | | |
|---|---|---|---|
| 6,014,845 A | | 1/2000 | Jain et al. |
| 6,060,154 A | * | 5/2000 | Adachi ............... C09D 7/67 |
| | | | 428/323 |
| 6,124,039 A | * | 9/2000 | Goetz ................. C22F 1/04 |
| | | | 428/650 |
| 8,995,055 B1 | | 3/2015 | Feng |
| 2005/0074566 A1 | | 4/2005 | Rouanet et al. |
| 2012/0099189 A1 | * | 4/2012 | Bezzel ............... E06B 9/264 |
| | | | 359/361 |

(Continued)

FOREIGN PATENT DOCUMENTS

EP        2726920 B1    8/2017

OTHER PUBLICATIONS

Trosifol Spallshield CPET, 2024, https://www.trosifol.com/fileadmin/user_upload/tools/downloads/product-brochures/Trosifol_spallshield_CPET.pdf, accessed Oct. 11, 2024 (Year: 2024).*

(Continued)

*Primary Examiner* — Stephone B Allen  
*Assistant Examiner* — Adam W Booher  
(74) *Attorney, Agent, or Firm* — Knobbe Martens Olson & Bear LLP (57) ABSTRACT

The present invention relates to a sheet for coating a glass surface having both shading and spectrally selective features in a single foil or film. The present invention relates also to an insulated glazing unit having a glass surface comprising the sheet having both shading and spectrally selective features in a single foil or film.

18 Claims, 6 Drawing Sheets

(56) References Cited

U.S. PATENT DOCUMENTS

| | | | |
|---|---|---|---|
| 2015/0129140 A1* | 5/2015 | Dean | E06B 9/24 160/5 |
| 2016/0290036 A1* | 10/2016 | Nukui | B32B 27/20 |
| 2019/0339431 A1 | 11/2019 | Wheatley et al. | |
| 2020/0123844 A1* | 4/2020 | Neuman | G02F 1/1523 |
| 2020/0341173 A1* | 10/2020 | Schmidt | G02B 5/003 |
| 2021/0155537 A1* | 5/2021 | Maria | C03C 17/3686 |

OTHER PUBLICATIONS

International Searching Authority/EPO, International Search Report and Written Opinion issued in corresponding application PCT/EP2022/054406 dated Jun. 3, 2022 (16 pages).

* cited by examiner

ANGULAR AND SPECTRALLY SELECTIVE SHADING SHEET

FIELD OF THE INVENTION

The present invention relates to a visually transparent sheet for application on a glass surface having both angular and spectrally selective solar shading features. The present invention relates also to an insulated glazing unit having a glass surface comprising the visually transparent sheet having both angular and spectrally selective solar shading features.

BACKGROUND OF THE INVENTION

Angular and spectral selectivity of solar radiation and light through transparent surface elements, such as glass panel, is becoming more and more important in architectural and mobility applications such as automotive, trains and ships.

Glass surface can be physically and chemically treated so as to provide spectral selectivity by creating a coating of partially transmissive area for radiation having a wavelength within the visible wavelengths range, and being either absorbing or reflective in other wavelengths such as the UV and IR range.

Glass surface may also be mechanically or chemically treated so as to produce reflection and scattering of incident light by depending on the incidence angle. Said effect can be achieved by creating reflective and absorbing portions that are inclined relative to the receiving surface such that at least a portion of the reflected radiation is re-directed within and along the glass panel.

Glass panel can also be covered by films, such as daylight film, containing optical prism elements that allows for transmittance of light with predetermined inclination angles and with light reflecting films reflecting part of the visible light incident to the surface of the daylight film. In this way, reflected light may be redirected internally for illuminating a room.

Indeed angular and spectral selectivity of incident irradiation on glass is generally achieved through the combination of different devices providing separately these functions.

Application of angular selective optical elements on a glass surface, with the objective to re-direct parts of the solar irradiance, will often impede the ability to look through the glass as the re-directed portion of the light dissolves the image. This is an undesired property as it limits the view through the glass.

Hence, there is the need for an integrated solution that would combine both angular and spectrally selective screening of the solar irrandiance in a single device, without significantly the visual transparency of the glass.

An improved device that would provide these functions in a single device would thus be advantageous, and in particular a more efficient and reliable angular and spectral selective shading device able to combine efficiently these functions in a sole device, would be advantageous.

OBJECT OF THE INVENTION

An object of the present invention is to provide an angular and spectrally selective and visually transparent solar shading device combining these functions into a single sheet or film suitable for application on a glass surface.

An object of the present invention may also be seen as to provide an alternative to the prior art.

In particular, it may be seen as a further object of the present invention to provide a sheet for coating or application on a glass surface providing angular and spectral selectivity that solves the above mentioned problems of the prior art by combining both functions in a single film.

SUMMARY OF THE INVENTION

Thus, the above-described object and several other objects are intended to be obtained in a first aspect of the invention by providing a sheet for coating or application on a glass surface comprising: at least one polymeric film substrate, spectrally selective or spectrally selective shading means and angular or angular selective shading means.

The sheet of the invention is a single film achieving angular and spectrally selective shading of solar irradiation for application on a single lite of glass or integrated into an insulated glazing unit consisting of two or more sheets of glass.

The sheet of the invention has the appearance of a transparent film which can be mounted on the surface of a glass by means of a transparent adhesive or laminated between two sheets of glass, for example by using transparent lamination materials and techniques.

The sheet of the invention for application on a glass surface is a sheet suitable for coating the glass surface.

In some embodiments, the spectrally selective shading means are or comprise one or more optically selective layers coating on a first side of the at least one polymeric film substrate.

The spectrally selective shading means may be or comprise one or more IR reflecting or absorbing optically selective layers coating on a first side of the at least one polymeric film substrate In other embodiments, the spectrally selective shading means are or comprise nano or microscopic particles suspended into the polymeric film substrate or an optically transparent coating applied onto said polymeric film substrate.

In some other embodiments, the angular selective shading means are or comprise shading elements, such as microscopic shading elements.

These shading elements are visually transparent when viewed from a certain distance.

The shading elements may be referred herein also as angular selective shading elements.

In some embodiments, the sheet for application on a glass surface according to first aspect of the invention further comprises bonding means, bonding the shading elements to a second side of the at least one polymeric film substrate. The second side may be opposite to the first side.

Thus in one aspect, the invention relates to a sheet for application on a glass surface comprising: at least one polymeric film substrate; one or more optically or spectrally selective layer coating a first side of the at least one polymeric film substrate; shading elements; and bonding means, bonding the shading elements to a second side of the at least one polymeric film substrate.

The one or more optically selective layers may be referred herein also as spectrally selective layers.

In some embodiments, the bonding means are or comprise one or more adhesive layers between the second side of said at least one polymeric film substrate and the shading elements.

In some further embodiments, the one or more adhesive layers are or comprise discontinuous layers.

A discontinuous layer may be a layer covering only the surface of the shading elements in contact with the second side of the polymeric film substrate.

In some further embodiments, the one or more adhesive layers are or comprise continuous layers.

In some preferred embodiments, the bonding means are or comprise one or more adhesive layers embedding the shading elements.

The bonding means or bonding elements may thus extend over the entire surface of the second side of the polymeric film substrate, extend only to the contact area between the shading elements and the polymeric film substrate or embed the shading elements.

Depending on their location, the bonding means must be optically transparent, i.e. when extending over the entire surface of one side of the polymeric film substrate, or may not be optically transparent, i.e. when extending only to the contact area between the shading elements and the polymeric film substrate.

In some embodiments, the angular selective shading means are or comprise a micro structured system comprising the shading elements.

The shading elements may be also referred herein as opaque elements.

The angular selective shading means may consist of a spatially shaped micro structured system or body of opaque elements providing an essentially opaque effect meaning that the visible part of solar irradiation falling onto the sheet of the invention is either reflected or absorbed but not transmitted through the micro structured body.

The micro structured body of opaque elements is shaped such that openings or perforations in the micro structured body allow for transmittance of solar radiation within certain inclination angles to the normal of the sheet of the invention. This is achieved by forming the opaque elements as micro lamellas or extensions mounted essentially perpendicular to the surface of the at least one polymer film substrate. The effect of the micro structured body of opaque elements is to absorb or reflect solar irradiation with high incidence angles from the normal to the at least one polymer film substrate, and allow for increased transmittance of irradiation with lower angles.

Above a certain angle, the cut-off angle, all irradiation falling onto the micro structured body of opaque elements is partly absorbed and reflected.

In some embodiments, the sheet for application on a glass surface according to the first aspect of the invention, further comprises at least one optical layer covering one or more surfaces of the shading elements.

The at least one optical layer covering one or more surfaces of the shading elements may be an optically absorbing or reflective coating.

In some embodiments, wherein the shading elements are made from naturally optically opaque materials, the at least one optical layer may be absent.

Accordingly, the angular selective shading means may comprise a micro structured system or body comprising shading elements coated by at least one optical layer onto one or more surfaces.

The angular selective shading means may thus consist of a spatially shaped structural body of shading elements being translucent or opaque elements and of at least one optical layer applied to the surface of these translucent or opaque elements. The at least one optical layer applied to the opaque or structural elements modifies their optical properties.

The combination of the micro structured body of translucent or opaque elements and the at least one optical layer coating the surface of the opaque or micro structured elements provides an essentially opaque optical effect meaning that the visible part of solar irradiation falling onto the micro structured body is either reflected or absorbed but not transmitted through the opaque elements.

The sheet of the invention integrates two fundamentally different methods of screening and shading solar radiation—firstly a reduction of the solar irradiation by screening certain wavelengths of the irradiant spectrum, and secondly a further reduction by screening the irradiation from certain angles.

The combination of these two screening principles and the use of a micro structure body of opaque elements allows for a highly effective and progressive reduction of the solar radiation transmitted through the sheet. By adjusting the specific properties of the sheet, the benefits below can be achieved:

The sheet is transparent for view to the outside as long as the line of sight is below the cut-off angle through the device, and the device will appear uniformly transparent from certain distances, provided that the opaque parts of the sheet are smaller than the resolution of the eye. This differentiates the sheet from known exterior shades, lamellas and screens that are characterized by being non-transparent and visible during operation.

The sheet of the invention also allows for transmittance of daylight from angles lower than the cut-off angle. As daylight originates from solar irradiation scattered in the sky and reflected of surroundings, it has a more uniformly distributed nature than the direct irradiated solar beam. As the sheet shows an increasing transmittance when the incidence angle moves from the cut-off point towards being parallel to the opaque elements extension in the micro structured body, the sheet allows a summed high transmittance of daylight proportional to the daylighting levels experienced in the exterior side of the sheet. The advantage is that transmitted daylighting level follows the normal solar cycle and helps maintain the circadian nature of the day and night to the benefit and wellbeing of occupants.

The color rendering of the sheet can be optimized without compromising the shading efficiency. If color neutral shading is attempted through the use of spectrally selective coatings only, the shading efficiency will be limited by the composition of the solar spectrum.

To achieve color neutral shading, the transmittance of the coating in the visible (VIS) range should be high and even, while the transmittance in the ultra violet (UV) and infrared (IR) parts of the spectrum should be as low as possible. Generally, it has proven difficult to obtain a total solar energy transmittance much below 0.25 to 0.30 if color rendering is to be maintained high, even with the use of advanced multilayer coating stacks. Solar shading coatings with solar shading efficiency above this level will influence the composition of the visible parts of the transmitted light and typically they appear tinted in blue, brown or gray color.

A further advantage of the sheet of the invention is that spectrally selective coatings with high color rendering can be used to obtain a moderate total solar transmittance in the 0.30 to 0.40 range. Further shading will be obtained through angular screening of the incident solar irradiation by the micro structured body comprising opaque elements, and the combined effect of the two shading mechanisms is naturally higher than that of the neutral coating alone. In this way, the sheet can obtain effective solar transmittance in the 0.05 to 0.15 range and maintain excellent color rendering.

The sheet demonstrates stronger shading from higher inclination angles and this brings the benefit that the shading will be stronger when the solar angles are higher in the summer, than in the winter when the sun is standing low in the sky. The sheet of the invention shows a progressive nature that brings more natural solar heating to buildings during the winter than in the summer. The benefit is that shading effect is aligned with the typical need for more shading in the summer than in the winter.

The sheet offers total shading of the direct solar beam from certain angles dictated by the structure and geometry of the micro structured body comprising opaque elements. Incident irradiation at angles above the cut-off angle will be fully blocked, while the intensity of irradiation from lower angles will be reduced gradually. Protection against direct solar beam is important for people working or resting in close proximity to glazed façades such as often is the case in office buildings, automobiles, trains, ships and similar. Direct solar exposure causes local heating formed directly on the skin and this is highly uncomfortable.

Another effect of shielding of the direct solar beam is improved optical glare protection. Glare effects on computer screens and other partly reflective surfaces caused by direct solar illuminance through glazed or transparent areas can be highly disturbing to users. The effect of glare on users is immediate and the only way to avoid this is by effectively blocking the direct solar illuminance by physical means. In the sheet of the invention, the micro structured body comprising opaque element performs such physical blocking of radiation from angles higher than the cut-off angle.

The sheet of the invention can be prepared such that the view from the outside through the sheet is impeded. This can be done by using a partly reflective coating as the selective layer on one side of the film, or by using a reflective coating on the side of the micro structured body comprising opaque elements that faces the exterior side. The effect of using either method is that light from the exterior side will be reflected from the front of the sheet and herewith effectively reduce the view to the interior side through the micro structure body.

The sheet of the invention can be configured to reduce the line of sight from the interior side and hence limit the view in certain angles. This effect is achieved by designing the micro structured body comprising opaque elements so as to achieve the appropriate cut-off angle.

By selecting the at least one optical layer or surface coating on the micro structured body comprising opaque elements, the structure body can be either reflective, absorbing or anything in between. The coating can be spectrally selective as well. The effect of this is that the solar irradiance will be reflected of the micro structured body comprising opaque elements and if oriented properly, this can be used to bring solar illumination further into a building.

Using instead a surface coating absorbing in the visible spectrum on the micro structure body comprising opaque elements will reduce the reflection from the surface and the effect being that the body will appear dark even though illuminated. The benefit is that the view from the inside to the outside through the micro structured body comprising opaque elements will be excellent even through the micro structure body is exposed to direct solar illuminance on the outside.

The sheet of the invention takes the form of a film and can be applied to a glass surface by a transparent pressure sensitive adhesive or sandwiched between two sheets of glass with the use of laminating techniques and materials such as EVA, PVB, ionomer or similar. The application may involve the use of equipment such as nip roll laminating of film to plate, heating in vacuum laminating presses or baking in autoclaves.

When the sheet of the invention is applied to a glass or laminated between two glass lites, an Insulated Glazing Unit (IGU) can be formed using this resulting glass including the shading device as the outer layer facing the sun.

Once integrated into an IGU, the IGU including the sheet can be installed like any other conventional IGU in any automotive or architectural application using the same techniques and tools.

Polymeric Film Substrate

The at least one polymeric film substrate serves as the mechanical backbone of the micro structure system comprising shading elements and provides also an optical surface for the one or more optically selective layers described below.

Two key parameters characterize said polymeric film substrate—1) it must be mechanically rigid to allow handling of the sheet without optical distortion, and 2) it must demonstrate optically flat surfaces and high optical transparency in at least parts of the solar spectrum.

The at least one polymeric film substrate may be manufactured in a vast variety of base polymers, thicknesses, functionalized surfaces and surface definitions.

In some embodiments, the at least one polymeric film substrate is or comprises a polyester based film substrate, such as a polyethylene terephthalate (PET) based film substrate.

In some other embodiments, the at least one polymeric film substrate is or comprises a fluorinated polymer film substrate, such as a fluorinated ethylene propylene (FEP) or an ethylene tetra fluoroethylene (ETFE) film substrate.

In some further embodiments, the at least one polymeric film substrate is or comprises a polyurethane based film substrate, or a cellulose based film substrate or a polyethylene or a polypropylene based film substrate.

A method to manufacture clear transparent polymer film substrate is by extrusion or calendaring and subsequent bi-directional stretching of the extruded film. The thickness of the at least one polymeric film substrate used in the sheet can be selected relatively freely and with some dependence to the specific material chosen.

In a preferred embodiment, the at least one polymeric film substrate has a thickness between 10 µm and 100 µm.

In another embodiment, the at least one polymeric film substrate has an elastic modulus higher than 500 MPa at 23° C. and preferably higher than 1000 MPa at 23° C. The tensile strength of the film may be minimum 40 MPa and preferably higher than 50 MPa.

A preferred polymeric film substrate for the sheet includes high transparency PET film stabilized for UV exposure in a thickness between 10 µm and 100 µm. Polymeric film substrate with thickness outside this range can also be used, but are less ideal. Polymeric film substrate with higher thickness reduce the optical transmittance and clarity through the film, and increases the optical haze, while film with lower thickness are difficult to handle and mechanically less stable.

An important property of the transparent film is the optical transmittance in the visible range of the spectrum. A typical clear PET film will exhibit transmittance above 80% at wave lengths from 330 nm to 380 nm, and more than 90% transmittance from 380 to 740 nm. PET films stabilized for UV exposure typically absorb in the UV range, and this influence also the transmittance in the visible range slightly. A typical UV stabilized film show sharp increase in transmittance round 360 nm and near 50% transmittance at 380 nm. In the range from 380 nm to 420 nm the transmittance further increases to round 90% and remains at this level until 740 nm. PET films with transmittance of 90% through most of the visible spectrum are preferred for the shading device, while films showing transmittances in the range 70 to 90% in the same part of the spectrum are acceptable also.

In some embodiments, the at least one polymeric film substrate has an average Transmittance (T %) above 70% at wavelengths between 380 nm to 740 nm.

Average Transmittance is defined as the arithmetic mean of the transmittance values within the defined spectral region of interest, e.g. with the Vis spectrum, i.e. between 380 nm to 740 nm.

Another important property determining the optical quality is the haze and clarity of the polymer film substrate. The haze should be low and the clarity as high as possible. Both these parameters are determined by the optical quality of the surfaces of the film, and by the composition and structure of the film material itself.

In some embodiments, the at least one polymeric film substrate has a haze of less than 3%, and in a preferred embodiment the haze is less than 1%.

In some embodiments, the at least one polymeric film substrate has a clarity higher than 98%, and in a preferred embodiment the clarity is higher than 99%.

In some embodiments, the at least one polymeric film substrate is coated with an optically selective layer reflecting or absorbing infrared radiation from the sun.

For example, the at least one polymeric film substrate may be coated with layer of IR absorbing or reflecting nano particles such as $LaB_6$, TiN or $Cs_{0.32}WO_3$, such as nanoparticles branded as CWO®.

Optically Selective Layers

The spectral selectivity of the one or more optically selective layers indicates that the coating has a varying transmittance and reflectance over a certain part of the spectrum. For the application in the described sheet, coatings with high optical transmittance in the VIS part of the spectrum, wavelengths from 380 to 740 nm, and low optical transmittance in the IR part of the spectrum from 740 to 2500 nm are well suited. The shift in transmittance near 740 nm and the stability of the transmittance in the VIS range are important for this application. The one or more optically selective layers for the sheet may have a constant high transmittance in the VIS range and a sharp decrease in transmittance at 740 nm. The one or more optically selective layers may also show a gradient change in the IR and VIS range.

The one or more optically selective layers may comprise a multilayer optical stack of metal and semiconductor material deposited in well controlled thickness and sequence.

The thicknesses of the multilayer can be varied to adjust the exact parameters of the coating.

Thus, in some embodiments, the one or more optically selective layers are or comprise one or more metal layers or combinations of one or more metal layers and semiconducting layers, such as metal oxides and metal nitrides.

Metal layers may be defined as layers comprising metal elements.

In some further embodiments, the one or more metal layers comprise Ag, Ti or Au.

In some other embodiments, the one or more semiconducting layers comprise ZnO, $Zn_2SnO_4$, $TiO_x$ or TiN.

In addition, the one or more optical selective layers, such as a multilayer optical stack typically contains also adhesion promoter layers, surface barriers protecting the metal layers against oxidations as well as chemical diffusion barriers preventing contamination from the substrate materials in the optical stack.

Thus, in some embodiments, the one or more optically selective layers comprise one or more barrier layers for protecting said one or more metal layers.

In some other embodiments, the one or more optically selective layers comprise one or more adhesion promoter layers.

In some further embodiments, the one or more optically selective layers comprise one or more chemical diffusion barrier layers.

The one or more optically selective layers can be prepared by sputtering or reactive sputtering processes in vacuum. In reactive sputtering metal oxides layers are formed by sputtering the pure metal in an oxygen containing atmosphere.

Sputtering of multilayer silver coatings and similar selective coatings onto PET film may also be used. Such selective coatings involving single, double or triple layer silver coatings or other coatings achieving a similar effect deposited on a transparent film is a preferred embodiment of the shading device. Transparent films including such selective coating typically demonstrate a transmittance round 75% in the range from 450 to 550 nm, and above 40% transmittance in the essential part of the visible spectrum from 400 to 740 nm.

Another route to manufacture optical selective coatings is to disperse nano particles in a polymeric film or coating on a film. Such nano particles can be prepared using materials like TiN, $LaB_6$ or $Cs_{0.32}WO_3$. The particles can be dispersed in acrylic (MMA) coating which is in turn applied to the polymeric base film. The effect of the nano particles is that they absorb and reflect the IR part of the irradiation, while showing only minimal absorption in the visual range.

In some embodiments, the at least one polymeric film substrate coated on said first side by said one or more optically selective layer has an average T % above 40% at wavelengths between 380 nm to 740 nm, such as between 400 nm to 740 nm.

In some preferred embodiments, the at least one polymeric film substrate coated on said first side by said one or more optically selective layers has an average T % above 60% at wavelengths between 380 nm to 740 nm, such as between 400 nm to 740 nm.

In some other embodiments, the one or more optically selective layers have an average T % below 60% at wavelengths between 740 nm to 2500 nm, i.e. in the Near infra-Red (NIR) region.

Micro Structured Body Comprising Shading Elements

The micro structured body or system comprising shading elements or opaque elements is a key functional elements of the sheet and it is predominantly responsible for the angular selective part of the shading effect, the physical shading of direct illuminance and transparency. The geometry of the micro structured body comprising opaque elements is critical to achieve the specific properties desired. The geometry of the opaque elements can be described and explained by two simple geometrical relations. The first parameter is the aspect ratio t/a, which is calculated from the extension t of opaque elements and the thickness a of the opaque elements.

Figure 4:
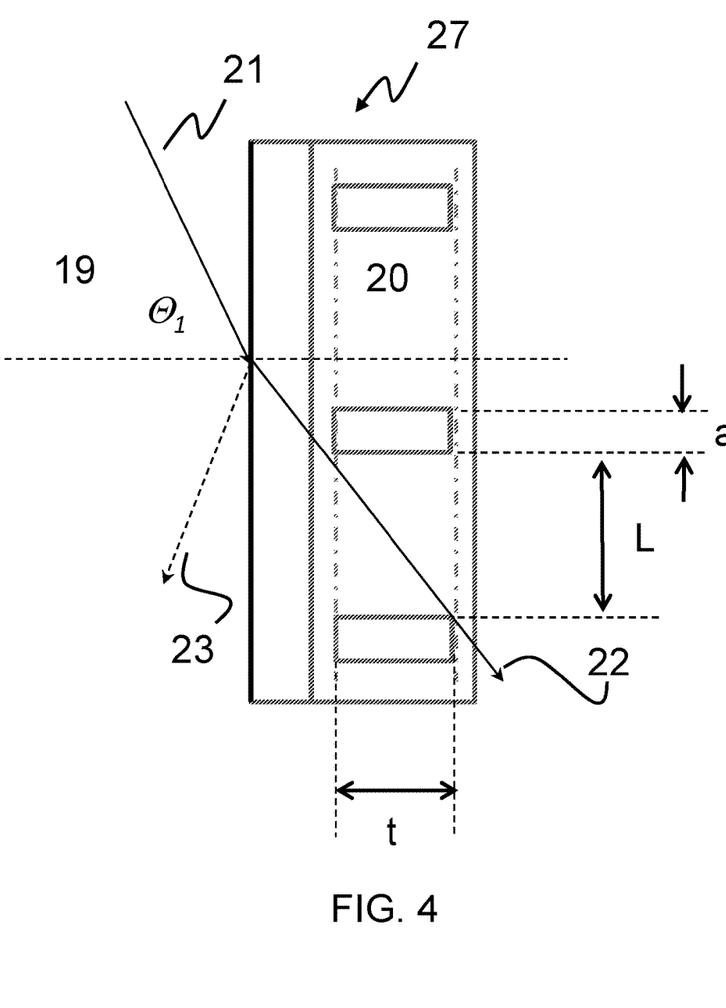
FIG. 4 is a schematic illustration of the sheet according to some embodiments of the invention in which the cut-off angle and the parameters related to it are shown.

The second parameter is the cut-off angle, which is defined by the extension of the opaque elements perpendicular to the film surface, the size of the openings or perforation in the micro structured body comprising opaque elements measured parallel to the surface and the refractive index of the material filling the space between the opaque extensions. The cut-off angle $\Theta_1$ as described in FIG. 4 below can be expressed by the equation [1] where $n_1$ and $n_2$ denote the refractive indices of the first and the second material, l equals the size of the transparent opening in the second material and t the extension of the opaque elements perpendicular to the surface of the film:

$$\theta_1 = \text{Arcsin}\left(\frac{n_2}{n_1}\sin\left(\text{Arctan}\left(\frac{l}{t}\right)\right)\right) \quad [1]$$

The shading elements may also be referred to as elongated elements.

In some embodiments, the shading elements are elongated elements having an extension t and a thickness a and an aspect ratio t/a of at least to 1, i.e. equal to or higher than 1 on average.

In some further embodiments, the elongated elements have an aspect ratio t/a of at least 2, i.e. equal to or higher than 2 on average.

In some other embodiments, the elongated elements have an aspect ratio t/a of at least 4, i.e. equal to or higher than 4 on average.

Generally, the shading efficiency of the shading elements or opaque elements or elongated elements increases with the decreasing cut-off angle $\Theta_1$. For applications in tempered climate zone like Europe, a common and well suited cut-off angle is near 60° as this corresponds to the maximum solar height in the region. If higher performance is required, the cut-off angle can be reduced to 55° or lower. Similarly, the performance of the micro structure body comprising opaque elements increases with increasing the aspect ratio. As the front area of the micro structure body comprising opaque elements decreases, the opaque elements allow a higher transmittance parallel to the opaque extensions to the benefit of view out and daylight intake.

The aspect ratio of a high performing opaque elements is round 4 or higher, while opaque elements with aspect ratios between 1 and 4 provide for low to moderate performance of the element. Aspect ratio below 1 is not recommendable.

In some embodiments, the elongated elements have a predetermined extension t and are spaced from each other by a predetermined value l, thereby the cut-off angle of the incident solar radiation onto a coated glass surface is 70° or less, such as 60° or less, for example 55° or less.

The size and dimension of the micro structured body comprising the opaque elements, should be shaped such that the size of each opaque elements has a size smaller than the resolution of the human eye in a certain distance from the opaque elements. The spatial resolution angle θ of the human eye is approximated by the equation [2] below, where λ is the wavelength of the light and D is the diameter of the pupil:

$$\theta \approx 1.22 \times \frac{\lambda}{D} \quad [2]$$

The maximum sensitivity is near a wavelength of 550 nm, and if we assume the diameter of the pupil to equal 4 mm in the daytime, the spatial resolution angle equal $1.68 \times 10^{-4}$ rad or $9.6 \times 10^{-3 \circ}$. Hence, in a viewing distance of 1 m the resolution of the human eye equals 0.167 mm, and this may serve as a guideline to the maximum size and dimension for each of the thickness a, in the opaque element. For most applications a maximum thickness size a of 150 µm has been found to be acceptable.

In some embodiments, the elongated elements have a predetermined thickness a equal or lower than 150 µm.

In other preferred embodiments, the elongated elements have a predetermined thickness a equal or lower than 75 µm.

The separation between the extensions l also plays a role in the performance of the opaque element. As the extensions often occurs as a regular structured pattern where extensions of similar size and shape are repeated numerous times in the element, they will form an optical grid and this will lead to formation of diffraction of the transmitted light. Diffraction is best observed with monochrome light sources, but is visible also with broad banded solar illumination under certain viewing conditions. The effect of diffraction is difficult to eliminate entirely, but it can be suppressed by using structures with varying optical grid structures and varying geometry of the separation between opaque elements. For regular structures, the absolute dimension of l is important. The lower the distance, the stronger the diffraction appear. For typical applications the spacing l should not be less than 250 µm, and good suppression of the diffractions are obtained at spacing above 300 µm. The upper limit for the spacing l is given by the extension of the opaque element and the total thickness of the shading device.

In some embodiments, the elongated elements are spaced from each other by a predetermined value l equal or higher than 250 µm.

The elongated elements are coated with the at least one optical layer showing an average optical reflection less than 15% in the range from 380 to 700 nm.

The at least one optical layer may contain at least a layer of metal and a layer of metaloxide.

The micro structured body containing the shading elements can be produced using multiple different techniques, including chemical milling and laser ablation of metals sheets, photo lithographic structuration of photo sensitive polymers or imprinting using UV curable resins.

Low Reflective Coating on Micro Structured Shading Element

The at least one optical layer or surface coating such as a metallic coating of aluminum or silver or similar can be used to create a low reflective surface.

Such dark, absorbing coatings can be achieved by creating a dual layer stack of a conductive and a dielectric material. Examples of such coatings include NbN—SiN, NiCr—$TiO_x$, NiCr—SiN, Ti—$TiO_x$, TiN—$TiO_x$ and TiN—SiN.

Alternatively a triple layer stack of a dielectric material coated with conductive material which in turn is coated with a dielectric material can be used to obtain a low reflective coating. Examples include coating stacks such as SiN—NiCr—SiN, TiN—NbN—SiN and NbN—TiN—SiN.

Endless other material and optical stack configurations are available showing high visible absorption and all such materials are usable in the shading device.

In some embodiments, the average optical reflection in the VIS range from 380 nm to 700 nm is less than 15%.

In other preferred embodiments, the average optical reflection in the VIS range from 380 nm to 700 nm is less than 10%.

The one or more optically low reflective layers layers can be deposited on the structured element by sputtering or reactive sputtering processes in vacuum.

In a second aspect the invention relates to an insulated glazing unit (IGU) having a glass surface on which the sheet according to the first aspect of the invention is applied.

The IGU according to the second aspect of the invention comprises the sheet according to the first aspect of the invention being a single film achieving angular and spectrally selective shading of solar irradiation on a single lite of glass or integrated inside the IGU consisting of two or more sheets of glass.

In some embodiments, the IGU comprises: one or more glass lites and the sheet according to the first aspect of the invention.

In some further embodiment of the IGU, the sheet is located onto an external surface of one of the one or more glass lites.

In some embodiments of the IGU, the sheet is located in between two of said one or more glass lites.

The IGU according to the second aspect may comprise one or more glass lites and the sheet according to the first aspect of the invention applied to an external surface, i.e. a surface that will be exposed to light irradiation and external environment during use, of one of the one or a glass lites or applied between two of the one or more glass lites of the IGU, i.e. applied to an internal surface of one of the one or a glass lites.

The first, second and other aspects and embodiments of the present invention may each be combined with any of the other aspects and embodiments. These and other aspects of the invention will be apparent from and elucidated with reference to the embodiments described hereinafter.

BRIEF DESCRIPTION OF THE FIGURES

The sheet for coating a glass surface according to the invention will now be described in more details with regard to the accompanying figures. The FIGS. show one way of implementing the present invention and are not to be construed as being limiting to other possible embodiments falling within the scope of the attached claim set.

DETAILED DESCRIPTION OF AN EMBODIMENT

Figure 1:
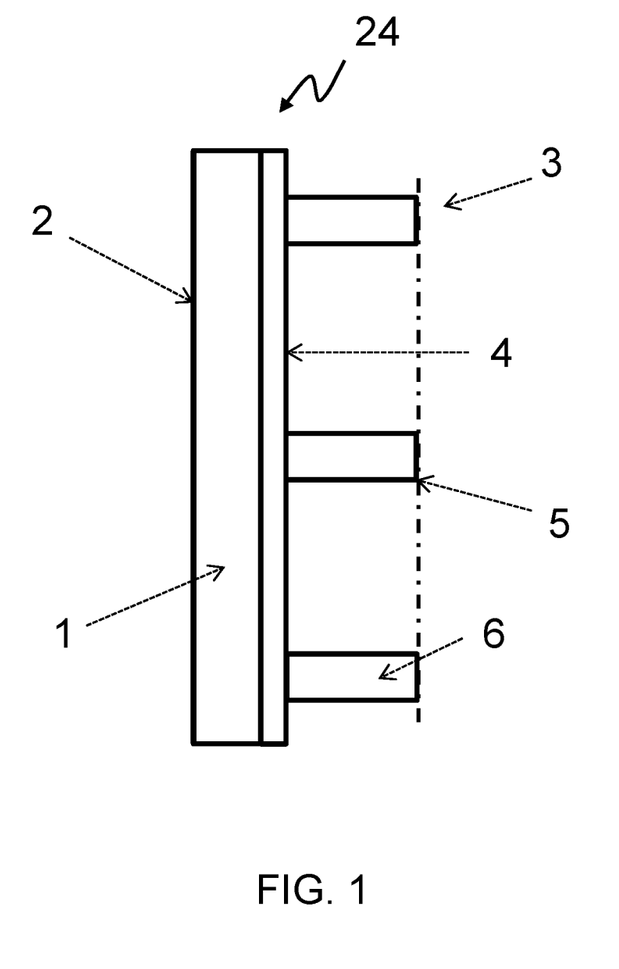
FIG. 1 is a schematic illustration of the sheet according to some embodiments of the invention having bonding means covering the full surface of one side of the polymeric film substrate.

FIG. 1 shows a schematic illustration of the sheet 24 according to some embodiments of the invention having bonding means, such as an adhesive layer 4 covering the full surface of one side of the polymeric film substrate 1.

The sheet 24, according to some embodiments of the invention, comprises a polymeric film substrate 1, a transparent optically selective layer 2 coating the polymeric film substrate 1, a micro structured body 3 comprising shading elements 6 having a spatially defined structure, an optical layer 5 coating at least part of the surface of the shading elements, which defines the optical properties of the shading elements and bonding means, such as an adhesive layer 4, bonding the micro structured body 3 to polymeric film substrate 1.

Figure 2:
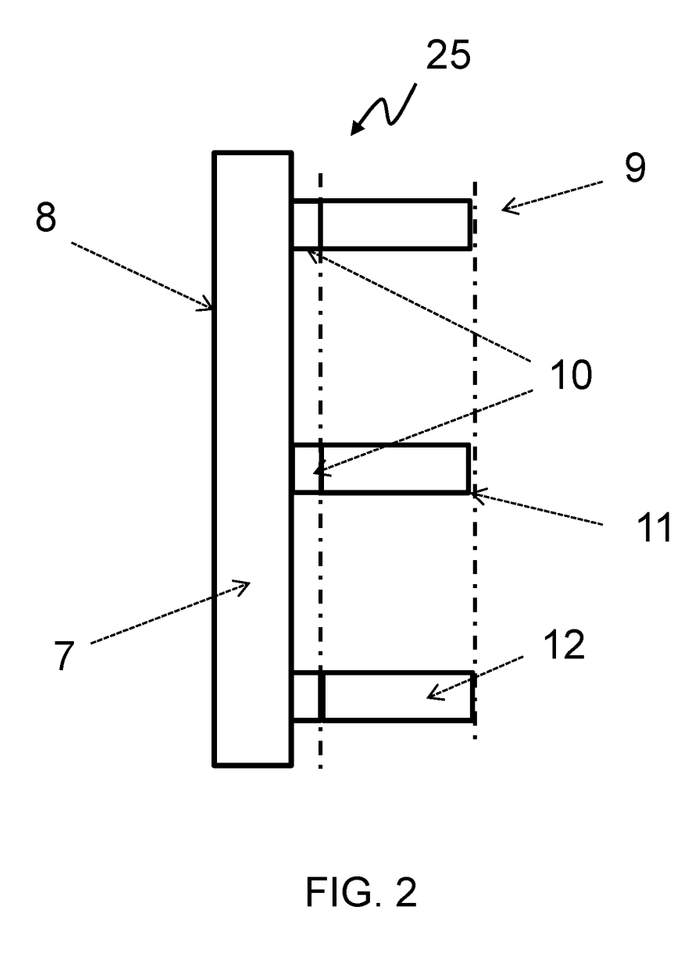
FIG. 2 shows a schematic illustration of the sheet according to some embodiments of the invention having bonding means covering only the contact areas between the shading elements and the polymeric film substrate.

FIG. 2 shows a schematic illustration of the sheet 25 according to some embodiments of the invention having bonding means, such as an adhesive layer 10 covering only the contact areas between the shading elements 12 and the polymeric film substrate 7.

The sheet 25, according to some embodiments of the invention, comprises a polymeric film substrate 7, a transparent optically selective layer 8 coating the polymeric film substrate 7, a micro structured body 9 comprising shading elements 12 having a spatially defined structure, an optical layer 11 coating at least part of the surface of the shading elements, which defines the optical properties of the shading elements. The bonding means, such as an adhesive layer 10, bonding the micro structured body 9 to polymeric film substrate 7 are located only in the area of contacts between the shading elements 12 and the polymeric film substrate 7.

Figure 3:
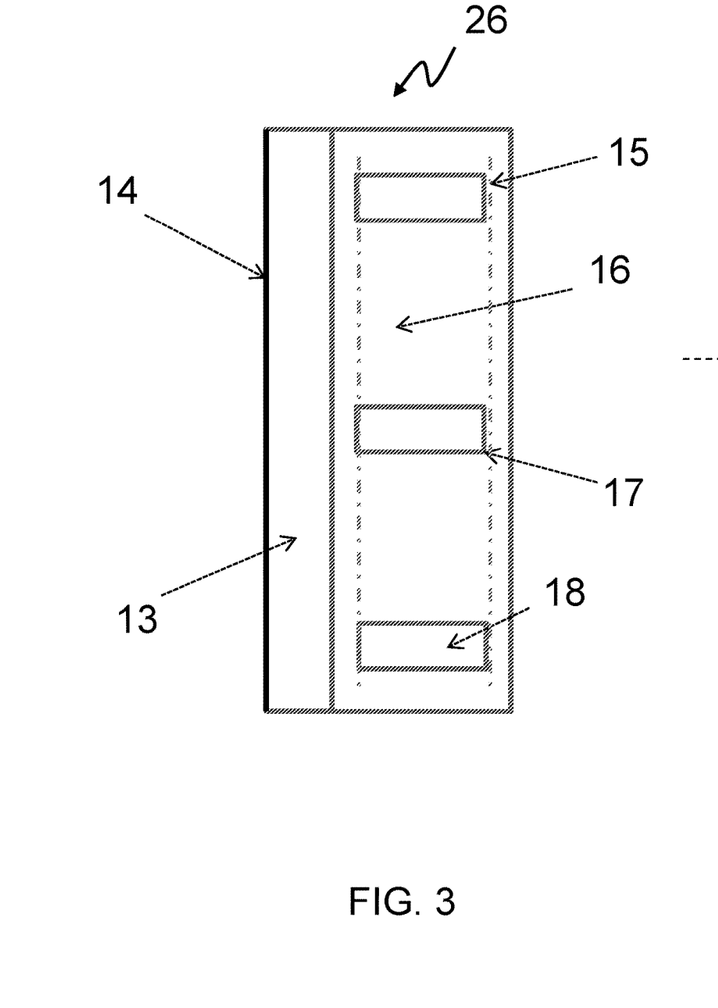
FIG. 3 is a schematic illustration of the sheet according to some embodiments of the invention having bonding means covering the full surface of one side of the polymeric film substrate and embedding the shading elements.

FIG. 3 is a schematic illustration of the sheet 26 according to some embodiments of the invention having bonding means, such as a polymer matrix composite 16, covering the full surface of one side of the polymeric film substrate 13 and embedding the shading elements 18.

The sheet 26, according to some embodiments of the invention, comprises a polymeric film substrate 13, a transparent optically selective layer 14 coating one surface of the polymeric film substrate 13, a micro structured body 15 comprising shading elements 18 having a spatially defined structure, an optical layer 17 coating at least part of the surface of the shading elements, which defines the optical properties of the shading elements. The bonding means, such as a polymer matrix composite 16, embed completely the shading elements 18 and bond the micro structured body 15 to polymeric film substrate 13.

FIG. 4 is a schematic illustration of the sheet 27 in which the cut-off angle $\Theta_1$ and the parameters related to it are shown.

As mentioned above the cut-off angle is defined by the equation [1], where $n_1$ and $n_2$ denote the refractive indices of the materials 19 and 20, L equals the size of the transparent opening in material 20 and t the extension of the shading elements perpendicular to the surface of the polymeric film substrate, while a is the thickness of the shading elements.

As shown in FIG. 4, the incident light beam 21 hitting the external surface of the sheet will be partially transmitted, i.e. light beam 22 and partially reflected, i.e. light beam 23, thus defining the cut-off angle $\Theta_1$.

Figure 5:
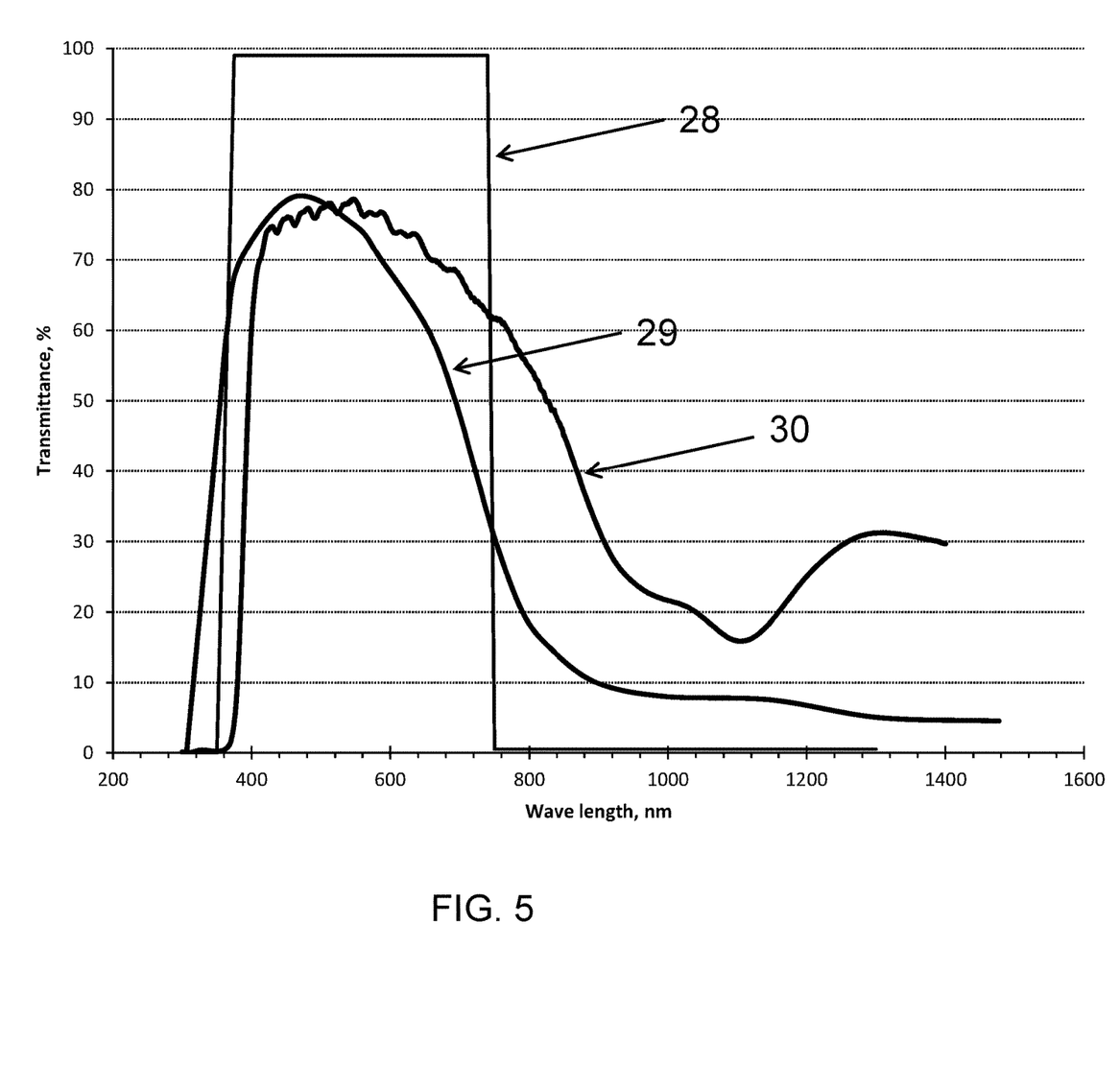
FIG. 5 is a schematic illustration of real spectrally selective coating stacks vs ideal spectrally selective coating stacks.

FIG. 5 is a schematic illustration of real spectrally selective coating stacks vs ideal spectrally selective coating stacks.

The schematic illustration in FIG. 5 shows transmittance curves for two selective coatings based on IR absorbing nano particles dispersed in a PMMA matrix. coating consisting of $LaB_6$ The examples both fulfill the requirements described for the sheet of the invention. The coating 30 is based on $LaB_6$ nanoparticles while coating 29 is prepared with $Cs_{0.32}WO_3$ nanoparticles. The coating 30 provides a higher transmittance in the VIS spectrum and better color rendering than coating 29. By contrast, the coating 29 shows the strongest shading effect of the IR spectrum. For the use in the sheet of the invention, both coating types can be used. Line 28 shows the ideal behavior having 100% transmittance in the VIS spectrum and 0% transmittance in the UV and NIR region.

Selective coatings as shown in FIG. 5 can be manufactured in multiple ways. An example of a IR absorbing coating like no. 29 can be prepared using the following approach:

1. $Cs_{0.32}WO_3$ (branded as CWO®) nanoparticles are commercially available in several standard formulations suitable for mixing with polymers.
2. A suitable coating can be achieved by mixing 12.3 wt. % CWO particles with 54.3 wt. % Methyl isobutyl ketone (MIBK) and 33.4 wt. % UV setting resin.
3. The solution containing the nano particles is applied to a PET film in a 6 μm thick uniform layer using slot die coating or similar wet coating technique.
4. The coating is dryed at 70° C. for 60 to 80 sec and UV cured with a UV dose of 250 to 260 mJ/cm² from a mercury lamp.

Figure 6:
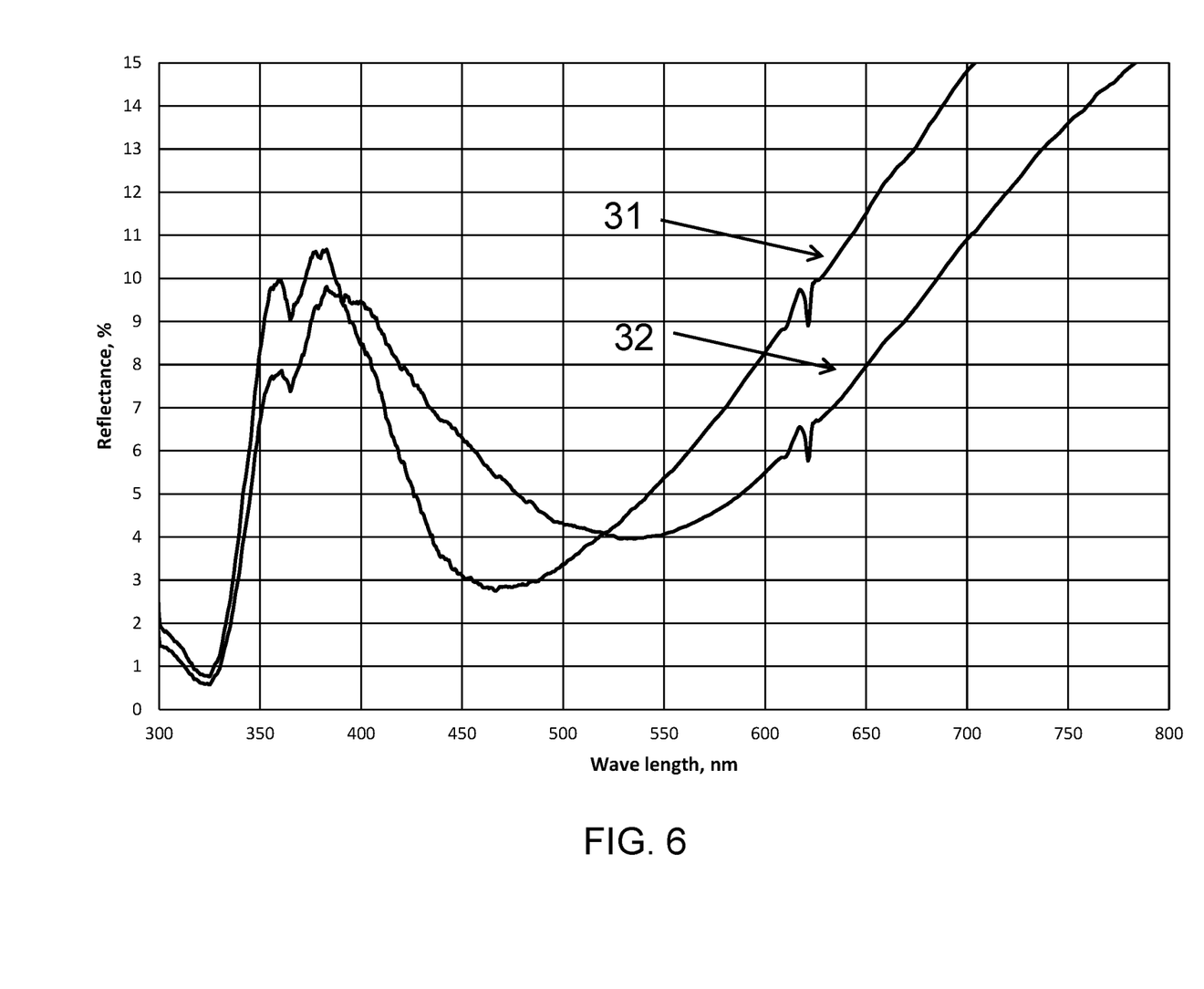
FIG. 6 is schematic illustration of the optical reflectance of an example of a metal-metaloxide stack forming the optical layer coated onto the micro structured body.

FIG. 6 includes examples of spectral reflectance curves for an optical layer 5 in FIG. 1, 11 in FIG. 2, or 17 in FIG. 3. The low reflecting structure is prepared using a Metal and Metal Oxide optical stack. The base layer includes a layer of Ti with a thickness from 40 to 200 nm deposited in a sputter process. The Metal Oxide layer includes TiOx deposited in a thickness of 42 nm and 45 nm. The optical reflectance curves 31 and 32 shown in FIG. 6, represent stacks of 40 to 200 nm Ti coated by 42 nm and 45 nm TiOx respectively.

Figure 7:
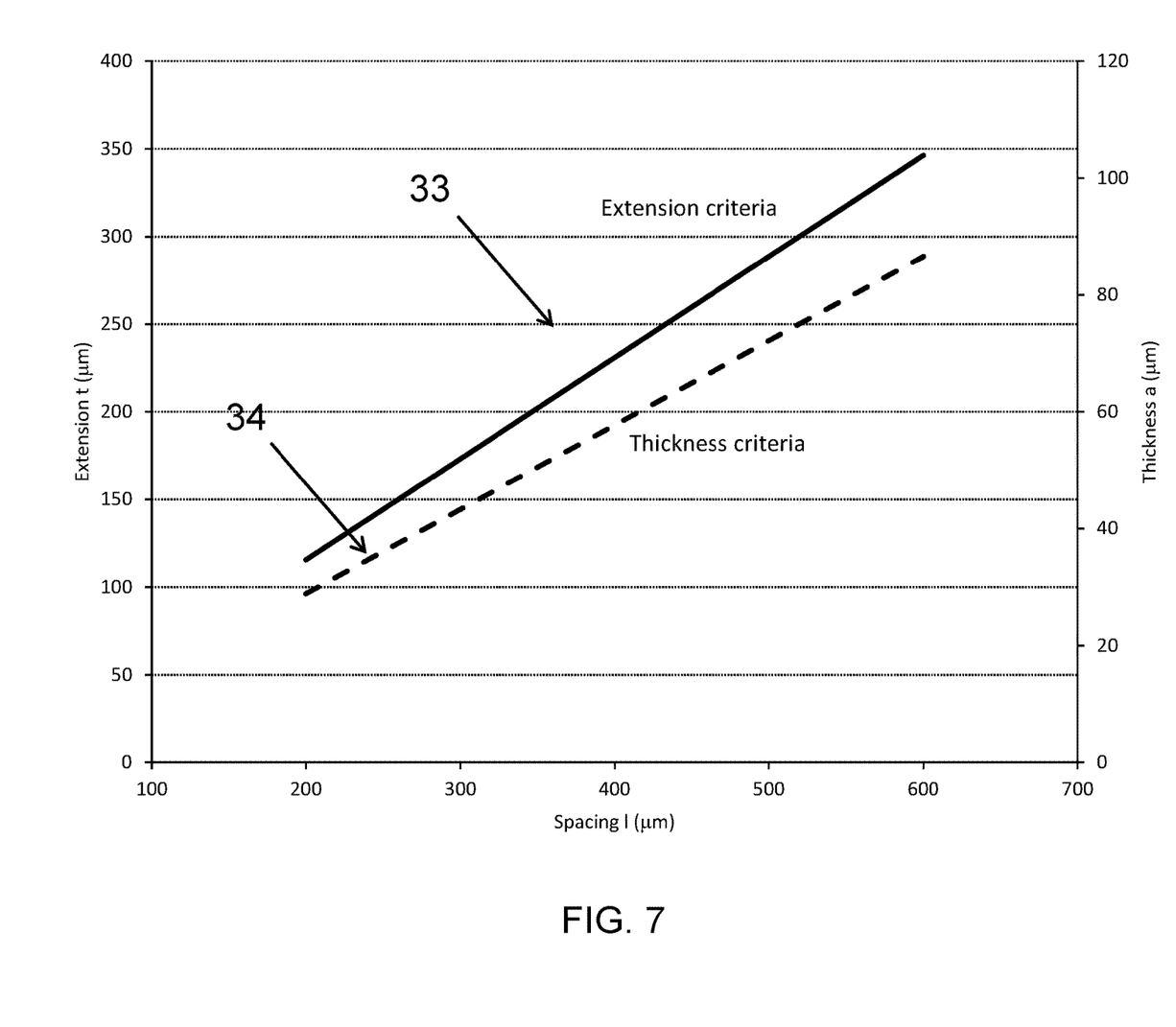
FIG. 7 and FIG. 8 are schematic illustrations for the calculation of the optimal design parameters for shading elements of the sheet according to some embodiments of the invention.

FIG. 7 is a schematic illustration for the calculation of the optimal design parameters for shading elements with a cut-off angle 60°, refractive index $n_2$ equal to 1, and aspect ratio equal to 4.

Figure 8:
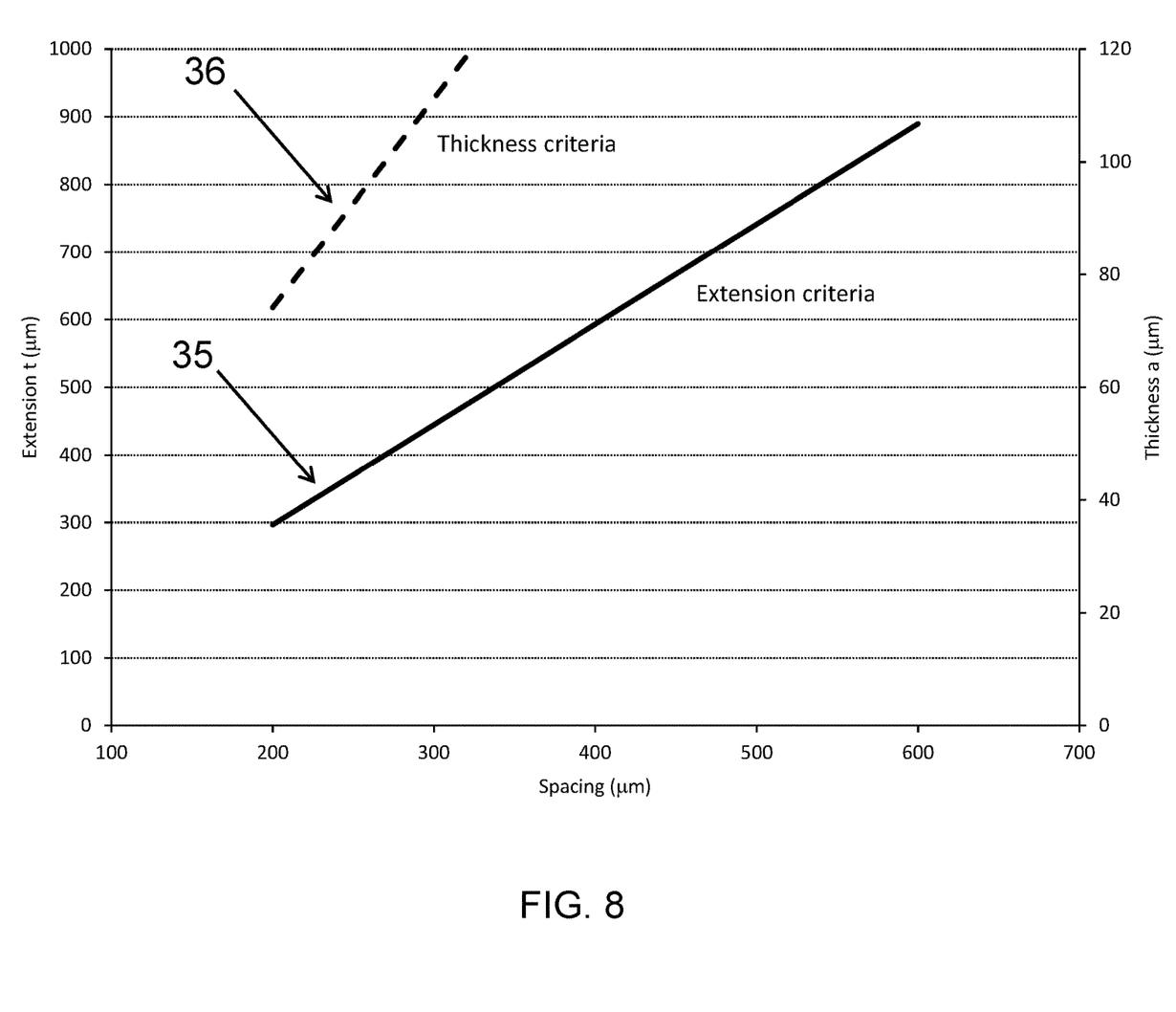

FIG. 8 is a schematic illustration for the calculation of the optimal design parameters for shading elements with cut-off angle 57°, refractive index $n_2$ equal to 1.5, and aspect ratio equal to 4.

The relation between the design parameters extension t 33 and 35 and lamella thickness a 34 and 36 of the shading elements are illustrated respectively in the FIGS. 6 and 7. It can be seen from the graphs that solutions using a spacer fill material with a refractive index higher than 1 dictates larger extension of the shading elements and for given aspect ratio this means that the visibility criteria of 0.150 μm sooner will be limiting. In addition, the thickness of the film will be higher.

The manufacturing of a micro structured body comprising opaque elements with high aspect ratio and specific geometry can be done through several ways including methods such as chemical milling of metallic substrates, UV lithography and roll forming of photoactive polymers. Chemical milling of metal substrates typically limit the achievable aspect ratio to about 2 or 3, while methods involving the shaping of polymeric materials through UV structuration can reach aspect ratios in the range from 3 to 10.

A specific method of producing the structured substrate involves UV lithography of a solid film with a thickness corresponding to the desired extension t of the lamellas.

1. A UV curing film can be prepared from materials based on epoxides, acrylates or co-polymers of the two. Films are prepared using slot die coating of the dissolved polymer onto a flexible carrier film, typically a PET film. A preferred embodiment of the structured substrate, includes an epoxy-acrylic copolymer film with a thickness in the range from 150 to 200 μm.
2. Structuration of the coated and dried film can be done using UV illumination with UV radiation of a wavelength exciting the UV activators added to the UV curing resin. The structuration occurs when parts of the polymer is shaded while other parts are illuminated. This can be done using a focused beam of UV light from a laser that creates the structure in a direct writing process or by masking the surface of the film with a photomask featuring a negative image of the desired structure and illuminating the masked film with a flood UV source.
3. Subsequent to curing the desired structure in the film, the uncured parts are removed by dissolving in a suitable developer solution. Developer solutions include both organic solvents and aqeous systems containing alkalis such as $HCO_3^-$ and $CO_3^{2-}$.
4. The last processing step includes cleaning and drying of the developed system followed by a post UV treatment to secure complete crosslinking of the UV curing resin.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A sheet for application on a glass surface comprising: at least one polymeric film substrate;
spectrally selective shading means, wherein said spectrally selective shading means comprise one or more optically selective layers coating on a first side of said at least one polymeric film substrate, wherein said one or more optically selective layers have an average T % below 60% across the wavelengths range between 740 nm to 2500 nm; and
angular selective shading means, wherein said angular selective shading means comprise shading elements and wherein said angular selective shading means comprise a micro structured system comprising said shading elements, wherein said shading elements are elongated elements having an extension t and a thickness a and an aspect ratio t/a of at least 1, and further comprising
bonding means, bonding said shading elements to a second side of said at least one polymeric film substrate and wherein said bonding means comprise one or more adhesive layers between said second side of said at least one polymeric film substrate and said shading elements.

2. A sheet for application on a glass surface according to claim 1, wherein said bonding means comprise one or more adhesive layers embedding said shading elements.

3. A sheet for application on a glass surface according to claim 1, further comprising at least one optical layer covering one or more surfaces of said shading elements.

4. A sheet for application on a glass surface according to claim 1, wherein said at least one polymeric film substrate has an average Transmittance (T %) above 70% at wavelengths between 380 nm to 740 nm.

5. A sheet for application on a glass surface according to claim 1, wherein said at least one polymeric film substrate comprises a polyurethane based film substrate, or a cellulose based film substrate or a polyethylene or a polypropylene based film substrate.

6. A sheet for application on a glass surface according to claim 1, wherein said at least one polymeric film substrate is coated with a layer of IR absorbing or reflecting nano particles.

7. A sheet for application on a glass surface according to claim 6, wherein said layer of IR absorbing or reflecting nano particles comprises $LaB_6$.

8. A sheet for application on a glass surface according to claim 6, wherein said layer of IR absorbing or reflecting nano particles comprises TiN.

9. A sheet for application on a glass surface according to claim 6, wherein said layer of IR absorbing or reflecting nano particles comprises $Cs_{0.32}WO_3$.

10. A sheet for application on a glass surface according to claim 1, wherein said one or more optically selective layers comprise one or more barrier layers for protecting one or more metal layers.

11. A sheet for application on a glass surface according to claim 1, wherein said one or more optically selective layers comprise one or more chemical diffusion barrier layers.

12. A sheet for application on a glass surface according to claim 1, wherein said at least one polymeric film substrate coated on said first side by said one or more optically selective layers has an average T % above 40% at wavelengths between 380 nm to 740 nm.

13. A sheet for application on a glass surface according to claim 1, wherein said elongated elements have an aspect ratio t/a of at least 2.

14. A sheet for application on a glass surface according to claim 13, wherein said elongated elements have a predetermined extension t and are spaced from each other by a predetermined value L, thereby the cut-off angle of the incident solar radiation onto a coated glass surface is 70° or less.

15. A sheet for application on a glass surface according to claim 14, wherein said elongated elements are spaced from each other by a predetermined value L equal or higher than 250 μm.

16. A sheet for application on a glass surface according to claim 1, wherein said elongated elements have a predetermined thickness a equal or lower than 150 μm.

17. An insulated glazing unit (IGU) comprising:
one or more glass lites;
and said sheet according to claim 1.

18. A sheet for application on a glass surface according to claim 1, wherein said at least one polymeric film substrate has a thickness between μm and 100 μm.

* * * * *